United States Patent
Hosur et al.

(10) Patent No.: US 6,356,605 B1
(45) Date of Patent: Mar. 12, 2002

(54) FRAME SYNCHRONIZATION IN SPACE TIME BLOCK CODED TRANSMIT ANTENNA DIVERSITY FOR WCDMA

(75) Inventors: Srinath Hosur, Dallas; Anand G. Dabak, Richardson, both of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/195,942

(22) Filed: Nov. 19, 1998

Related U.S. Application Data
(60) Provisional application No. 60/103,383, filed on Oct. 7, 1998.

(51) Int. Cl.⁷ .............................. H04B 7/10; H04L 1/02
(52) U.S. Cl. ...................................... 375/347; 375/343
(58) Field of Search ................................ 375/347, 354, 375/316, 136, 142, 143, 145, 147, 149, 150, 343

(56) References Cited

U.S. PATENT DOCUMENTS

| | | | |
|---|---|---|---|
| 5,228,054 A | | 7/1993 | Rueth et al. .................... 375/1 |
| 5,767,738 A | * | 6/1998 | Brown et al. ................ 329/304 |
| 6,166,622 A | * | 12/2000 | Hosur et al. ................. 340/318 |
| 6,226,315 B1 | * | 5/2001 | Sriram et al. ................ 375/140 |

OTHER PUBLICATIONS

"Report On FPLMTS Radio Transmission Technology Special Group", (Round 2 Activity Report), Association of Radio Industries and Business (ARIB), FPLMTS Study Committee, Draft Version E1.1, Jan. 10, 1997, 224 pp.

"Proposed Wideband CDMA (W–CDMA)", Association of Radio Industries and Businesses (ARIB), Japan, Jan. 1997, 213 pp.

* cited by examiner

Primary Examiner—Mohammad H. Ghayour
(74) Attorney, Agent, or Firm—Robert N. Rountree; Wade James Brady, III; Frederick J. Telecky, Jr.

(57) ABSTRACT

A circuit is designed with a correction circuit (350) coupled to receive a first estimate signal ($\alpha_j^1$), a second estimate signal ($\alpha_j^2$), and a plurality of input signals from an external source along plural signal paths. The plurality of input signals includes a first and a second input signal ($R_j^1$, $R_j^2$) The correction circuit produces a first symbol estimate in response to the first and second estimate signals and the first and second input signals. The correction circuit produces a second symbol estimate in response to the first and second estimate signals and the first and second input signals. A combining circuit is coupled to receive a plurality of first symbol estimates including the first symbol estimate and a plurality of second symbol estimates including the second symbol estimate. The combining circuit produces a first symbol signal ($\tilde{S}_1$) in response to the plurality of first symbol estimates and a second symbol signal ($\tilde{S}_2$) in response to the plurality of second symbol estimates. A synchronization circuit (408) is coupled to receive the first and second symbol signals (400–406) and a first known symbol and a second known symbol (410–416). The synchronization circuit produces a synchronization signal (418) in response to an approximate match between the first symbol signal and the first known symbol and between the second symbol signal and the second known symbol.

27 Claims, 2 Drawing Sheets

FRAME SYNCHRONIZATION IN SPACE TIME BLOCK CODED TRANSMIT ANTENNA DIVERSITY FOR WCDMA

This amendment claims priority under 35 USC § 119(e)(1) of provisional application No. 60/103,383, filed Oct. 7, 1998.

FIELD OF THE INVENTION

This invention relates to wideband code division multiple access (WCDMA) for a communication system and more particularly to space time block coded transmit antenna diversity for frame synchronization of WCDMA signals.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. Patent Application No. 60/082,671, filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into sixteen equal time slots of 0.625 milliseconds each. Each time slot is further subdivided into equal symbol times. At a data rate of 32 KSPS, for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

Previous studies have shown that multiple transmit antennas may improve reception by increasing transmit diversity for narrow band communication systems. In their paper *New Detection Schemes for Transmit Diversity with no Channel Estimation*, Tarokh et al. describe such a transmit diversity scheme for a TDMA system The same concept is described in *A Simple Transmitter Diversity Technique for Wireless Communications* by Alamouti. Tarokh et al and Alamouti, however, fail to teach such a transmit diversity scheme for a WCDMA communication system.

Other studies have investigated open loop transmit diversity schemes such as orthogonal transmit diversity (OTD) and time switched time diversity (TSTD) for WCDMA systems. Both OTD and TSTD systems have similar performance. Both use multiple transmit antennas to provide some diversity against fading, particularly at low Doppler rates and when there are insufficient paths for the rake receiver. Both OTD and TSTD systems, however, fail to exploit the extra path diversity that is possible for open loop systems. For example, the OTD encoder circuit of FIG. 5 receives symbols $S_1$ and $S_2$ on lead 500 and produces output signals on leads 504 and 506 for transmission by first and second antennas, respectively. These transmitted signals are received by a despreader input circuit (not shown). The despreader circuit sums received chip signals over a respective symbol time to produce first and second output signals $R_j^1$ and $R_j^2$ on leads 620 and 622 as in equations [1–2], respective $$R_j^1 = \sum_{i=0}^{N-1} r_j(i+\tau_j) = \alpha_j^1 S_1 + \alpha_j^2 S_2 \qquad [1]$$

$$R_j^2 = \sum_{i=N}^{2N-1} r_j(i+\tau_j) = \alpha_j^1 S_1 - \alpha_j^2 S_2 \qquad [2]$$

The OTD phase correction circuit of FIG. 6 receives the output signals $R_j^1$ and $R_j^2$ corresponding to the $j^{th}$ of L multiple signal paths. The phase correction circuit produces soft outputs or signal estimates $\tilde{S}_1$ and $\tilde{S}_2$ for symbols $S_1$ and $S_2$ at leads 616 and 618 as shown in equations [3–4], respectively.

$$\tilde{S}_1 = \sum_{j=1}^{L} (R_j^1 + R_j^2)\alpha_j^{1*} = \sum_{j=1}^{L} 2|\alpha_j^1|^2 S_1 \qquad [3]$$

$$\tilde{S}_2 = \sum_{j=1}^{L} (R_j^1 - R_j^2)\alpha_j^{2*} = \sum_{j=1}^{L} 2|\alpha_j^2|^2 S_2 \qquad [4]$$

Equations [3–4] show that the OTD method provides a single channel estimate α for each path j. A similar analysis for the TSTD system yields the same result. The OTD and TSTD methods, therefore, are limited to a path diversity of L. This path diversity limitation fails to exploit the extra path diversity that is possible for open loop systems as will be explained in detail.

SUMMARY OF THE INVENTION

These problems are resolved by a circuit is designed with a correction circuit coupled to receive a first estimate signal, a second estimate signal, and a plurality of input signals from an external source along plural signal paths. The plurality of input signals includes a first and a second input signal. The correction circuit produces a first symbol estimate in response to the first and second estimate signals and the first and second input signals. The correction circuit produces a second symbol estimate in response to the first and second estimate signals and the first and second input signals. A combining circuit is coupled to receive a plurality of first symbol estimates including the first symbol estimate and a plurality of second symbol estimates including the second symbol estimate. The combining circuit produces a first symbol signal in response to the plurality of first symbol estimates and a second symbol signal in response to the plurality of second symbol estimates. A synchronization circuit is coupled to receive the first and second symbol signals and a first known symbol and a second known symbol. The synchronization circuit produces a synchronization signal in response to an approximate match between the first symbol signal and the first known symbol and between the second symbol signal and the second known symbol.

The present invention improves frame synchronization by providing at least 2L diversity over time and space. No additional transmit power or bandwidth is required. Power is balanced across multiple antennas.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1:
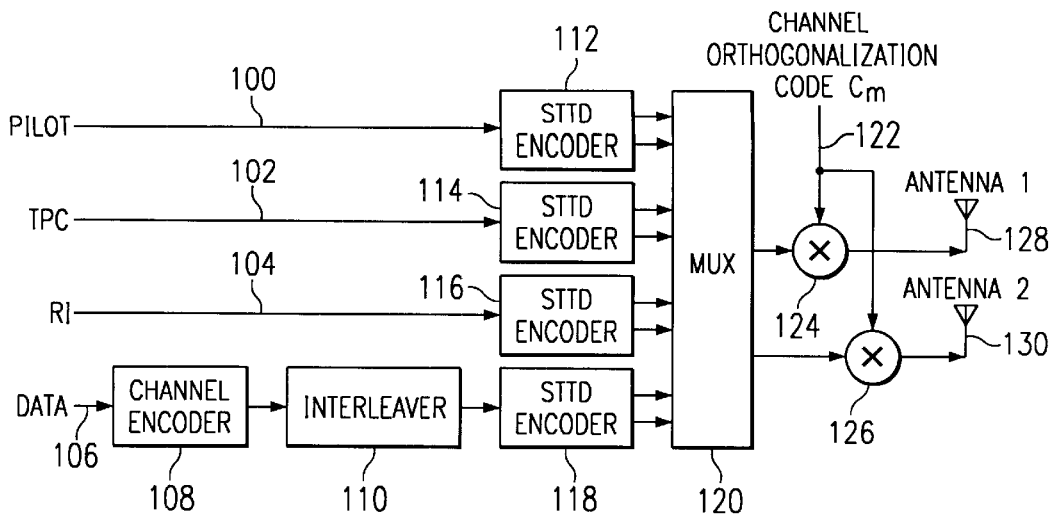
FIG. 1 is a simplified block diagram of a typical transmitter using Space Time Transit Diversity (STTD) of the present invention.

Referring to FIG. 1, there is a simplified block diagram of a typical transmitter using Space Time Transit Diversity (STTD) of the present invention. The transmitter circuit receives pilot symbols, TPC symbols, RI symbols and data symbols on leads 100, 102, 104 and 106, respectively. Each of the symbols is encoded by a respective STTD encoder as will be explained in detail. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Figure 2:
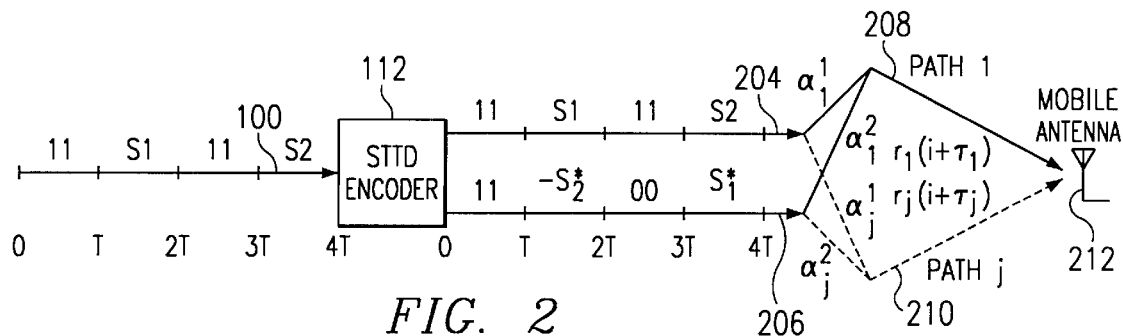
FIG. 2 is a block diagram showing signal flow in an STTD encoder of the present invention that may be used with the transmitter of FIG. 1.

Turning now to FIG. 2, there is a block diagram showing signal flow in an STTD encoder of the present invention that may be used with the transmitter of FIG. 1 for pilot symbol encoding. The pilot symbols are predetermined control signals that may be used for channel estimation and other functions as will be described in detail. Operation of the STTD encoder 112 will be explained with reference to TABLE 1. The STTD encoder receives pilot symbol 11 at symbol time T, pilot symbol $S_1$ at symbol time 2T, pilot symbol 11 at symbol time 3T and pilot symbol $S_2$ at symbol time 4T on lead 100 for each of sixteen time slots of a frame. For a first embodiment of the present invention having a data rate of preferably 32 KSPS, the STTD encoder produces a sequence of four pilot symbols for each of two antennas corresponding to leads 204 and 206, respectively, for each of the sixteen time slots of TABLE 1. The STTD encoder produces pilot symbols $B_1$, $S_1$, $B_2$ and $S_2$ at symbol times T-4T, respectively, for a first antenna at lead 204. The STTD encoder simultaneously produces pilot symbols $B_1$, $-S_2^*$, $-B_2$ and $S_1^*$ at symbol times T-4T, respectively, at lead 206 for a second antenna. Each symbol includes two bits representing a real and imaginary component. An asterisk indicates a complex conjugate operation or sign change of the imaginary part of the symbol. Pilot symbol values for the first time slot for the first antenna at lead 204, therefore, are 11, 11, 11 and 11. Corresponding pilot symbols for the second antenna at lead 206 are 11, 01, 00 and 10.

The bit signals $r_j(i+\tau_j)$ of these symbols are transmitted serially along respective paths 208 and 210. Each bit signal of a respective symbol is subsequently received at a remote mobile antenna 212 after a transmit time $\tau$ corresponding to the $j^{th}$ path. The signals propagate to a despreader input circuit (not shown) where they are summed over each respective symbol time to produce input signals $R_j^1$, $R_j^2$, $R_j^3$ and $R_j^4$ corresponding to the four pilot symbol time slots and the $j^{th}$ of L multiple signal paths as previously described.

TABLE 1

| SLOT | ANTENNA 1 | | | | ANTENNA 2 | | | |
|---|---|---|---|---|---|---|---|---|
| | $B_1$ | $S_1$ | $B_2$ | $S_2$ | $B_1$ | $-S_2^*$ | $-B_2$ | $S_1^*$ |
| 1 | 11 | 11 | 11 | 11 | 11 | 01 | 00 | 10 |
| 2 | 11 | 11 | 11 | 01 | 11 | 11 | 00 | 10 |
| 3 | 11 | 01 | 11 | 01 | 11 | 11 | 00 | 00 |
| 4 | 11 | 10 | 11 | 01 | 11 | 11 | 00 | 11 |
| 5 | 11 | 10 | 11 | 11 | 11 | 01 | 00 | 11 |
| 6 | 11 | 10 | 11 | 11 | 11 | 01 | 00 | 11 |
| 7 | 11 | 01 | 11 | 00 | 11 | 10 | 00 | 00 |
| 8 | 11 | 10 | 11 | 01 | 11 | 11 | 00 | 11 |
| 9 | 11 | 11 | 11 | 00 | 11 | 10 | 00 | 10 |
| 10 | 11 | 01 | 11 | 01 | 11 | 11 | 00 | 00 |
| 11 | 11 | 11 | 11 | 10 | 11 | 00 | 00 | 10 |
| 12 | 11 | 01 | 11 | 01 | 11 | 11 | 00 | 00 |
| 13 | 11 | 00 | 11 | 01 | 11 | 11 | 00 | 01 |
| 14 | 11 | 10 | 11 | 00 | 11 | 10 | 00 | 11 |
| 15 | 11 | 01 | 11 | 00 | 11 | 10 | 00 | 00 |
| 16 | 11 | 00 | 11 | 00 | 11 | 10 | 00 | 01 |

The imput signals corresponding to the pilot symbols for each time slot are given in equations [5–8]. Noise terms are omitted for simplicity. Received signal $R_j^1$ is produced by pilot symbols $(B_1,B_1)$ having a constant value (11,11) at symbol time T for all time slots. Thus, the received signal is equal to the sum of respective Rayleigh fading parameters corresponding to the first and second antennas. Likewise, received signal $R_j^3$ is produced by pilot symbols $(B_2,-B_2)$ having a constant value (11,00) at symbol time 3T for all time slots. Channel estimates for the Rayleigh fading parameters corresponding to the first and second antennas, therefore, are readily obtained from input signals $R_j^1$ and $R_j^3$ as in equations [9] and [10].

$$R_j^1 = \alpha_j^1 + \alpha_j^2 \qquad [5]$$

$$R_j^2 = \alpha_j^1 S_1 - \alpha_j^2 S_2^* \qquad [6]$$

$$R_j^3 = \alpha_j^1 - \alpha_j^2 \qquad [7]$$

$$R_j^4 = \alpha_j^1 S_1 + \alpha_j^2 S_1^* \qquad [8]$$

$$\alpha_j^1 = (R_j^1 + R_j^3)/2 \qquad [9]$$

$$\alpha_j^2 = (R_j^1 - R_j^3)/2 \qquad [10]$$

Figure 3:
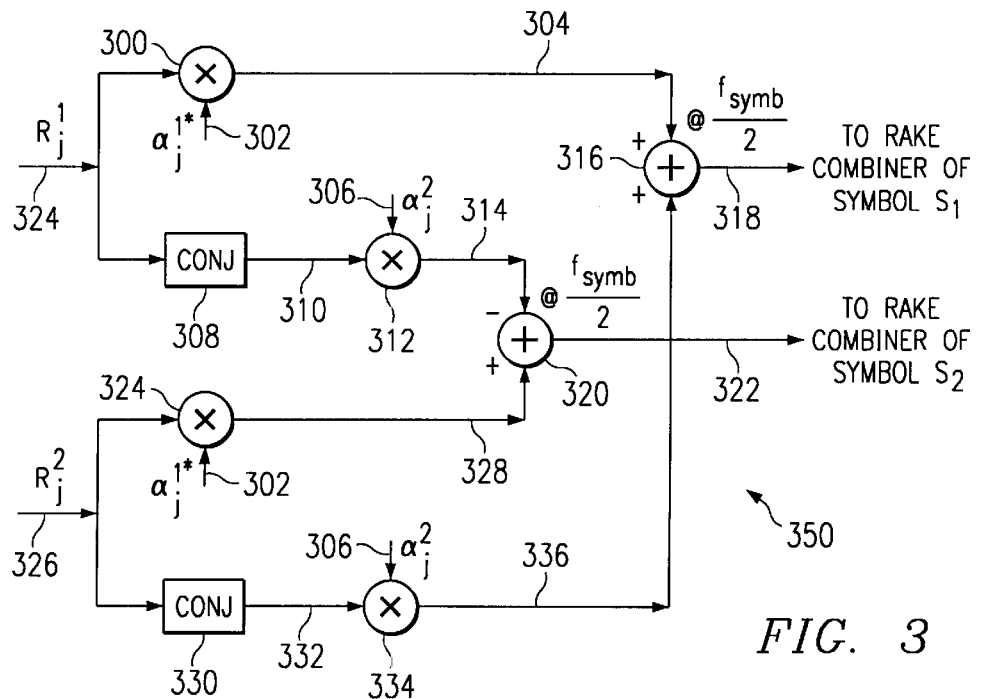
FIG. 3 is a schematic diagram of a phase correction circuit of the present invention that may be used with a receiver.

Referring now to FIG. 3, there is a schematic diagram of a phase correction circuit of the present invention that may be used with a remote mobile receiver. This phase correction circuit receives input signals $R_j^2$ and $R_j^4$ on leads 324 and 326 at symbol times 2T and 4T, respectively. Each input signal has a value determined by the transmitted pilot symbols as shown in equations [6] and [8], respectively. The phase correction circuit receives a complex conjugate of a channel estimate of a Rayleigh fading parameter $\alpha_j^{1*}$ corresponding to the first antenna on lead 302 and a channel estimate of another Rayleigh fading parameter $\alpha_j^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [11] and [12].

$$R_j^2\alpha_j^{1*}+R_j^{4*}\alpha_j^2=(|\alpha_j^1|^2+|\alpha_j^2|^2)S_1 \quad [11]$$

$$-R_j^{2*}\alpha_j^2+R_j^4\alpha_j^{1*}=(|\alpha_j^1|^2+|\alpha_j^2|^2)S_2 \quad [12]$$

These path-specific symbol estimates are then applied to a rake combiner circuit to sum individual path-specific symbol estimates, thereby providing net soft symbols or pilot symbol signals as in equations [13] and [14].

$$\tilde{S}_1 = \sum_{j=1}^{L} R_j^2\alpha_j^{1*} + R_j^{4*}\alpha_j^2 \quad [13]$$

$$\tilde{S}_2 = \sum_{j=1}^{L} -R_j^{2*}\alpha_j^2 + R_j^4\alpha_j^{1*} \quad [14]$$

These soft symbols or estimates provide a path diversity L and a transmit diversity 2. Thus, the total diversity of the STTD system is 2L. This increased diversity is highly advantageous in providing a reduced bit error rate.

Figure 4:
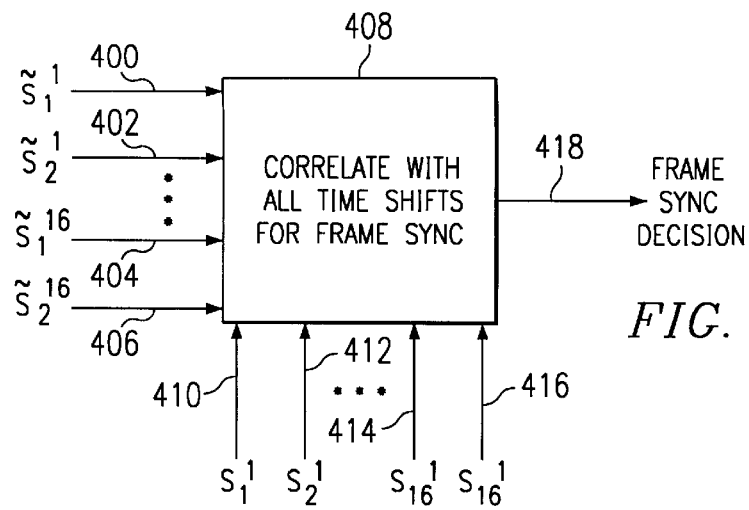
FIG. 4 is a block diagram of a frame synchronization circuit that may be used with STTD of the present invention.
Figure 5:
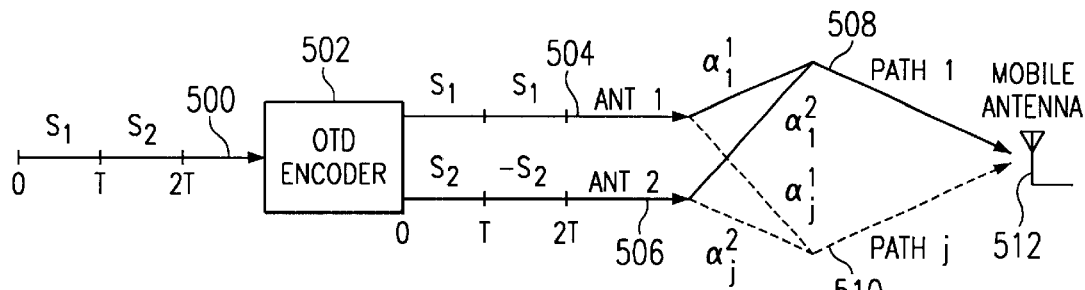
FIG. 5 is a block diagram showing signal flow in an OTD encoder of the prior art.
Figure 6:
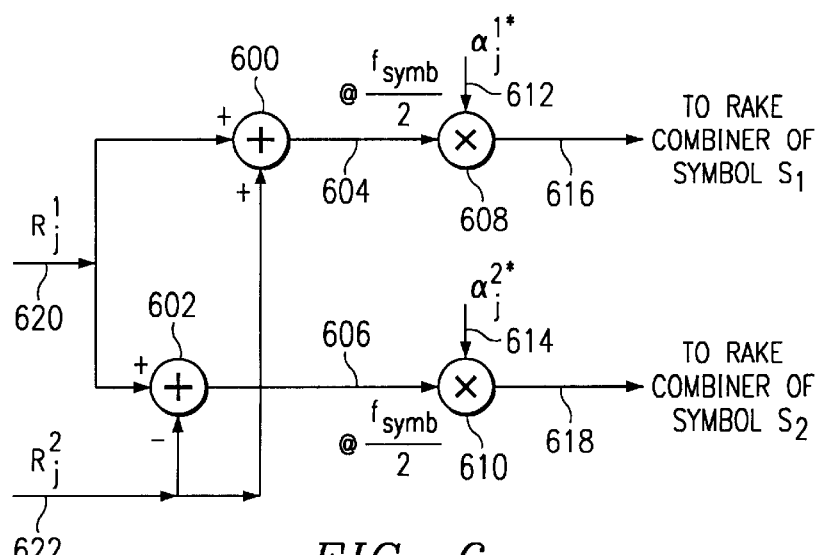
FIG. 6 is a schematic diagram of a phase correction circuit of the prior art.
Figure 1:
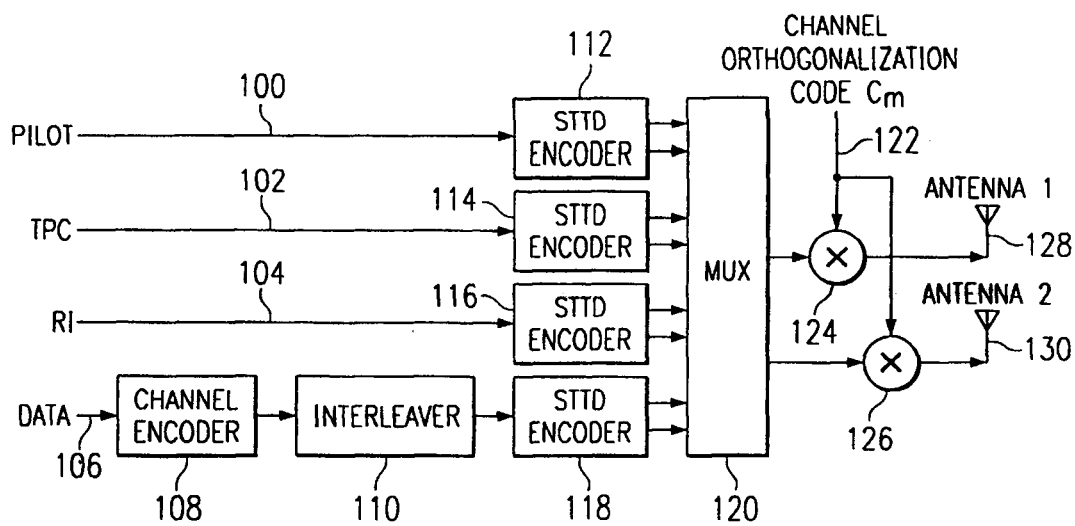
Figure 2:
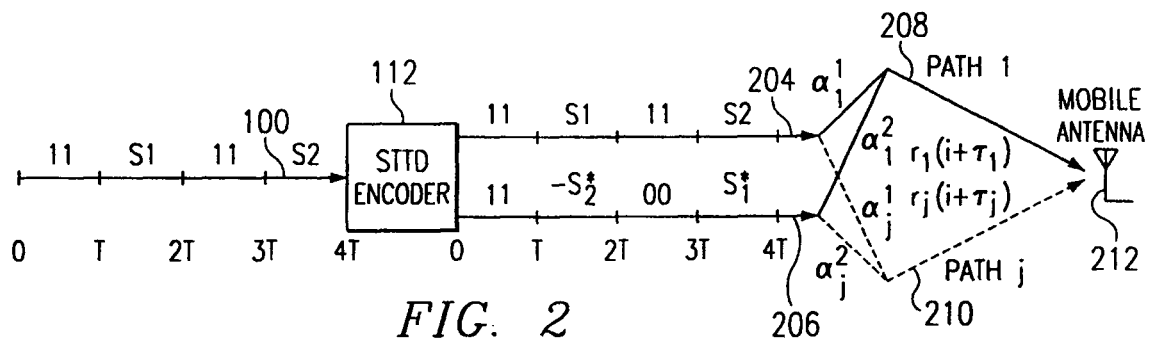
Figure 3:
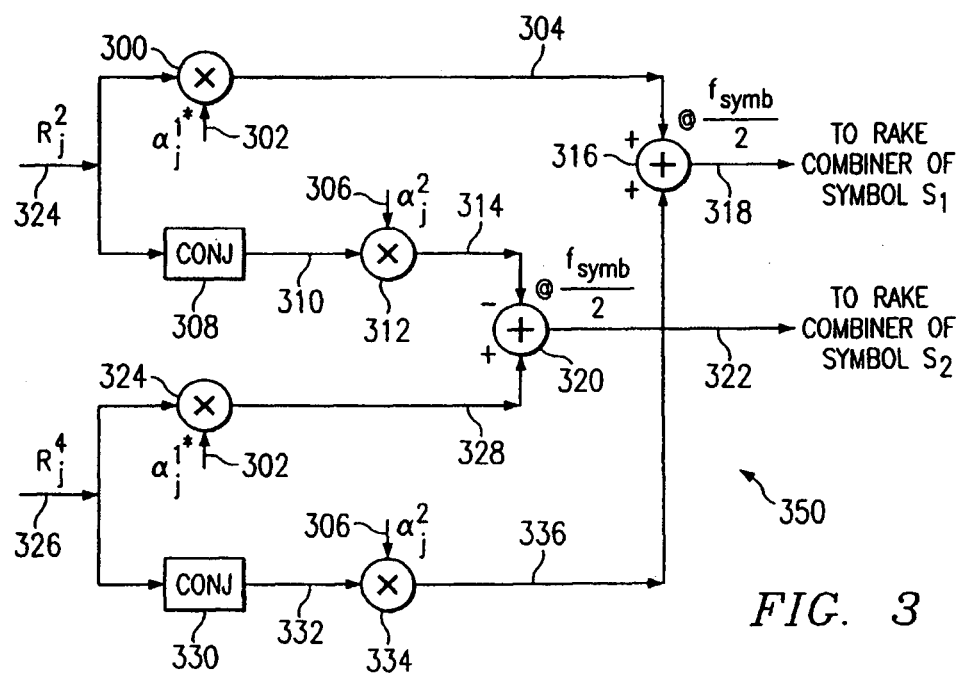

Turning now to FIG. 4, there is a block diagram of a frame synchronization circuit that may be used with STTD of the present invention. The circuit compares soft symbol signals $\tilde{S}_{1,j}$ and $\tilde{S}_{2,j}$ at leads 400–406 to the complex conjugates of known pilot symbols $S_{1,k}$ and $S_{2,k}$ at leads 410–416 for each of the sixteen time slots as in equation [15]. This comparison produces an approximate match when all soft symbol signals are multiplied by their respective known complex conjugate symbols, thereby producing a real result having a maximum value. The synchronization circuit produces frame synchronization signal FS on lead 418 in response to this real result. The reliability of this approximate match is substantially improved in view of the superior soft symbol signals obtained through the additional diversity provided by STTD.

$$FS = \sum_{k=1}^{16}\sum_{i=1}^{16} \tilde{S}_{1,i}S_{1,k}^* + \tilde{S}_{2,i}S_{2,k}^* \quad [15]$$

Although the invention has been described in detail with reference to its preferred embodiment, it is to be understood that this description is by way of example only and is not to be construed in a limiting sense. For example, the pilot symbol patterns of TABLE 1 are suitable for data rates of 16, 32, 64 and 128 KSPS having four pilot symbols in each time slot. Other patterns produce a similar result. The pattern of TABLE 2, for example, applied to the second antenna produces the same result.

TABLE 2

| SLOT | $B_1^*$ | $-S_2^*$ | $-B_2^*$ | $S_1^*$ |
|---|---|---|---|---|
| 1 | 10 | 01 | 01 | 10 |
| 2 | 10 | 11 | 01 | 10 |
| 3 | 10 | 11 | 01 | 00 |
| 4 | 10 | 11 | 01 | 11 |
| 5 | 10 | 01 | 01 | 11 |
| 6 | 10 | 01 | 01 | 11 |
| 7 | 10 | 10 | 01 | 00 |
| 8 | 10 | 11 | 01 | 11 |
| 9 | 10 | 10 | 01 | 10 |
| 10 | 10 | 11 | 01 | 00 |
| 11 | 10 | 00 | 01 | 10 |
| 12 | 10 | 11 | 01 | 00 |
| 13 | 10 | 11 | 01 | 01 |
| 14 | 10 | 10 | 01 | 11 |
| 15 | 10 | 10 | 01 | 00 |
| 16 | 10 | 10 | 01 | 01 |

A change of pilot symbols from $(B_1,B_2)$ to $(B_1^*,-B_2^*)$ in TABLE 2 produces equations [16] and [17] corresponding to previous equations [5] and [7], respectively. Thus, complex conjugates of the channel estimates are readily determined as in equations [18] and [19], corresponding to previous equations [9] and [10], respectively.

$$R_j^1=\alpha_j^1B_1+\alpha_j^2B_1^* \quad [16]$$

$$R_j^3=\alpha_j^1B_2-\alpha_j^2B_2^* \quad [17]$$

$$\alpha_j^1=(R_j^1B_1^*+R_j^3B_2^*)/2 \quad [18]$$

$$\alpha_j^2=(R_j^1B_1-R_j^3B_2)/2 \quad [19]$$

The inventive concept of the present invention is readily adaptable to other data rates having a number of pilot symbols other than four. For example, TABLE 3 and TABLE 4 give the pilot symbol patterns for data rates with two and eight pilot symbols in each time slot for the first and second antennas, respectively. Likewise, TABLE 5 and TABLE 6 give the pilot symbol patterns for data rates with sixteen pilot symbols in each time slot for the first and second antennas, respectively.

TABLE 3

| | 8 KSPS | | 256, 512, 1024 KSPS | | | | | | |
|---|---|---|---|---|---|---|---|---|---|
| SLOT | 0 | 1 | 0 | 1 | 2 | 3 | 4 | 5 | 6 | 7 |
| 1 | 11 | 11 | 11 | 11 | 11 | 11 | 11 | 11 | 11 | 10 |
| 2 | 11 | 11 | 11 | 10 | 11 | 10 | 11 | 10 | 11 | 01 |
| 3 | 11 | 10 | 11 | 10 | 11 | 10 | 11 | 11 | 11 | 01 |
| 4 | 11 | 01 | 11 | 11 | 11 | 01 | 11 | 00 | 11 | 10 |
| 5 | 11 | 10 | 11 | 11 | 11 | 00 | 11 | 01 | 11 | 10 |
| 6 | 11 | 10 | 11 | 11 | 11 | 11 | 11 | 01 | 11 | 10 |
| 7 | 11 | 01 | 11 | 10 | 11 | 11 | 11 | 01 | 11 | 10 |
| 8 | 11 | 00 | 11 | 01 | 11 | 00 | 11 | 10 | 11 | 00 |
| 9 | 11 | 00 | 11 | 11 | 11 | 10 | 11 | 00 | 11 | 01 |
| 10 | 11 | 10 | 11 | 01 | 11 | 11 | 11 | 11 | 11 | 00 |
| 11 | 11 | 10 | 11 | 10 | 11 | 10 | 11 | 11 | 11 | 10 |
| 12 | 11 | 11 | 11 | 01 | 11 | 10 | 11 | 10 | 11 | 00 |
| 13 | 11 | 10 | 11 | 10 | 11 | 01 | 11 | 11 | 11 | 10 |
| 14 | 11 | 11 | 11 | 00 | 11 | 10 | 11 | 10 | 11 | 00 |
| 15 | 11 | 00 | 11 | 01 | 11 | 10 | 11 | 00 | 11 | 00 |
| 16 | 11 | 00 | 11 | 10 | 11 | 00 | 11 | 00 | 11 | 00 |

TABLE 4

| | 8 KSPS | | 256, 512, 1024 KSPS | | | | | | |
| --- | --- | --- | --- | --- | --- | --- | --- | --- | --- |
| SLOT | 0 | 1 | 0 | 1 | 2 | 3 | 4 | 5 | 6 | 7 |
| 1 | 11 | 11 | 11 | 01 | 00 | 10 | 11 | 00 | 00 | 10 |
| 2 | 11 | 11 | 11 | 00 | 00 | 11 | 11 | 11 | 00 | 11 |
| 3 | 11 | 10 | 11 | 11 | 00 | 11 | 11 | 11 | 00 | 10 |
| 4 | 11 | 01 | 11 | 11 | 00 | 10 | 11 | 00 | 00 | 01 |
| 5 | 11 | 10 | 11 | 10 | 00 | 10 | 11 | 00 | 00 | 00 |
| 6 | 11 | 10 | 11 | 01 | 00 | 10 | 11 | 00 | 00 | 00 |
| 7 | 11 | 01 | 11 | 01 | 00 | 11 | 11 | 00 | 00 | 00 |
| 8 | 11 | 00 | 11 | 10 | 00 | 00 | 11 | 10 | 00 | 11 |
| 9 | 11 | 00 | 11 | 00 | 00 | 10 | 11 | 11 | 00 | 01 |
| 10 | 11 | 10 | 11 | 01 | 00 | 00 | 11 | 10 | 00 | 10 |
| 11 | 11 | 10 | 11 | 00 | 00 | 11 | 11 | 00 | 00 | 10 |
| 12 | 11 | 11 | 11 | 00 | 00 | 00 | 11 | 10 | 00 | 11 |
| 13 | 11 | 10 | 11 | 11 | 00 | 11 | 11 | 00 | 00 | 10 |
| 14 | 11 | 11 | 11 | 00 | 00 | 01 | 11 | 10 | 00 | 11 |
| 15 | 11 | 00 | 11 | 00 | 00 | 00 | 11 | 10 | 00 | 01 |
| 16 | 11 | 00 | 11 | 10 | 00 | 11 | 11 | 10 | 00 | 01 |

TABLE 5

| | 2048, 4096 KSPS | | | | | | | | | | | | | | | |
| --- | --- | --- | --- | --- | --- | --- | --- | --- | --- | --- | --- | --- | --- | --- | --- | --- |
| SLOT | 0 | 1 | 2 | 3 | 4 | 5 | 6 | 7 | 8 | 9 | 10 | 11 | 12 | 13 | 14 | 15 |
| 1 | 11 | 01 | 11 | 10 | 11 | 11 | 11 | 10 | 11 | 01 | 11 | 00 | 11 | 00 | 11 | 01 |
| 2 | 11 | 01 | 11 | 01 | 11 | 10 | 11 | 11 | 11 | 01 | 11 | 01 | 11 | 10 | 11 | 01 |
| 3 | 11 | 01 | 11 | 10 | 11 | 00 | 11 | 01 | 11 | 11 | 11 | 11 | 11 | 01 | 11 | 10 |
| 4 | 11 | 11 | 11 | 11 | 11 | 01 | 11 | 01 | 11 | 11 | 11 | 01 | 11 | 00 | 11 | 01 |
| 5 | 11 | 00 | 11 | 00 | 11 | 11 | 11 | 01 | 11 | 10 | 11 | 00 | 11 | 11 | 11 | 11 |
| 6 | 11 | 00 | 11 | 11 | 11 | 10 | 11 | 01 | 11 | 10 | 11 | 00 | 11 | 10 | 11 | 11 |
| 7 | 11 | 01 | 11 | 00 | 11 | 10 | 11 | 00 | 11 | 10 | 11 | 10 | 11 | 01 | 11 | 01 |
| 8 | 11 | 01 | 11 | 00 | 11 | 11 | 11 | 10 | 11 | 11 | 11 | 10 | 11 | 11 | 11 | 00 |
| 9 | 11 | 11 | 11 | 11 | 11 | 01 | 11 | 11 | 11 | 11 | 11 | 10 | 11 | 10 | 11 | 01 |
| 10 | 11 | 10 | 11 | 01 | 11 | 10 | 11 | 10 | 11 | 10 | 11 | 00 | 11 | 11 | 11 | 00 |
| 11 | 11 | 00 | 11 | 01 | 11 | 11 | 11 | 01 | 11 | 01 | 11 | 01 | 11 | 01 | 11 | 11 |
| 12 | 11 | 11 | 11 | 00 | 11 | 10 | 11 | 10 | 11 | 00 | 11 | 01 | 11 | 00 | 11 | 11 |
| 13 | 11 | 11 | 11 | 11 | 11 | 11 | 11 | 00 | 11 | 00 | 11 | 10 | 11 | 11 | 11 | 11 |
| 14 | 11 | 00 | 11 | 01 | 11 | 10 | 11 | 10 | 11 | 00 | 11 | 00 | 11 | 00 | 11 | 10 |
| 15 | 11 | 00 | 11 | 11 | 11 | 10 | 11 | 00 | 11 | 10 | 11 | 01 | 11 | 01 | 11 | 11 |
| 16 | 11 | 00 | 11 | 00 | 11 | 00 | 11 | 11 | 11 | 00 | 11 | 10 | 11 | 01 | 11 | 00 |

TABLE 6

| | 2048, 4096 KSPS | | | | | | | | | | | | | | | |
| --- | --- | --- | --- | --- | --- | --- | --- | --- | --- | --- | --- | --- | --- | --- | --- | --- |
| SLOT | 0 | 1 | 2 | 3 | 4 | 5 | 6 | 7 | 8 | 9 | 10 | 11 | 12 | 13 | 14 | 15 |
| 1 | 11 | 00 | 00 | 00 | 11 | 00 | 00 | 10 | 11 | 10 | 00 | 00 | 11 | 11 | 00 | 01 |
| 2 | 11 | 11 | 00 | 00 | 11 | 01 | 00 | 11 | 11 | 11 | 00 | 00 | 11 | 11 | 00 | 11 |
| 3 | 11 | 00 | 00 | 00 | 11 | 11 | 00 | 01 | 11 | 01 | 00 | 10 | 11 | 00 | 00 | 00 |
| 4 | 11 | 01 | 00 | 10 | 11 | 11 | 00 | 00 | 11 | 11 | 00 | 10 | 11 | 11 | 00 | 01 |
| 5 | 11 | 10 | 00 | 01 | 11 | 11 | 00 | 10 | 11 | 10 | 00 | 11 | 11 | 01 | 00 | 10 |
| 6 | 11 | 01 | 00 | 01 | 11 | 11 | 00 | 11 | 11 | 10 | 00 | 11 | 11 | 01 | 00 | 11 |
| 7 | 11 | 10 | 00 | 00 | 11 | 10 | 00 | 11 | 11 | 00 | 00 | 11 | 11 | 11 | 00 | 00 |
| 8 | 11 | 10 | 00 | 00 | 11 | 00 | 00 | 10 | 11 | 00 | 00 | 10 | 11 | 10 | 00 | 10 |
| 9 | 11 | 01 | 00 | 10 | 11 | 01 | 00 | 00 | 11 | 00 | 00 | 11 | 11 | 00 | 00 | 11 |
| 10 | 11 | 11 | 00 | 11 | 11 | 00 | 00 | 11 | 11 | 10 | 00 | 11 | 11 | 10 | 00 | 10 |
| 11 | 11 | 11 | 00 | 01 | 11 | 11 | 00 | 10 | 11 | 11 | 00 | 00 | 11 | 01 | 00 | 00 |
| 12 | 11 | 10 | 00 | 10 | 11 | 00 | 00 | 11 | 11 | 11 | 00 | 01 | 11 | 01 | 00 | 01 |
| 13 | 11 | 01 | 00 | 10 | 11 | 10 | 00 | 10 | 11 | 00 | 00 | 11 | 11 | 01 | 00 | 10 |
| 14 | 11 | 11 | 00 | 01 | 11 | 00 | 00 | 11 | 11 | 10 | 00 | 01 | 11 | 00 | 00 | 01 |
| 15 | 11 | 01 | 00 | 01 | 11 | 10 | 00 | 11 | 11 | 11 | 00 | 11 | 11 | 01 | 00 | 00 |
| 16 | 11 | 10 | 00 | 01 | 11 | 01 | 00 | 01 | 11 | 00 | 00 | 01 | 11 | 10 | 00 | 00 |

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

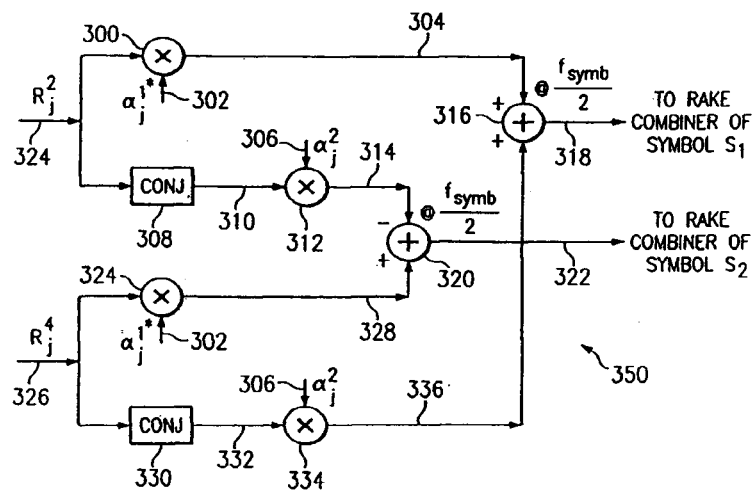

What is claimed:

1. A circuit, comprising:
    a correction circuit coupled to receive a first estimate signal, a second estimate signal, and a plurality of input signals from an external source along plural signal paths, the plurality of input signals including a first and a second input signal, the correction circuit producing a first symbol estimate in response to the first and second estimate signals and the first and second input signals, the correction circuit producing a second symbol estimate in response to the first and second estimate signals and the first and second input signals;
    a combining circuit coupled to receive a plurality of first symbol estimates including the first symbol estimate and a plurality of second symbol estimates including the second symbol estimate, the combining circuit producing a first symbol signal in response to the plurality of first symbol estimates and producing a second symbol signal in response to the plurality of second symbol estimates; and a synchronization circuit coupled to receive the first and second symbol signals and a first known symbol and a second known symbol, the synchronization circuit producing a synchronization signal in response to an approximate match between the first symbol signal and the first known symbol and between the second symbol signal and the second known symbol.

2. A circuit as in claim 1, further comprising an estimate circuit coupled to receive at least a first predetermined signal and a second predetermined signal from the external source, each of the first and second predetermined signals having respective predetermined values, the estimate circuit producing the first estimate signal and the second estimate signal in response to the first and second predetermined signals.

3. A circuit as in claim 2, wherein each of the first and second predetermined signals are pilot symbols.

4. A circuit as in claim 2, wherein the estimate circuit, the correction circuit, the combining circuit and the synchronization circuit are formed on a single integrated circuit.

5. A circuit as in claim 1, further comprising an input circuit coupled to receive a plurality of signals from the external source along the plural signal paths, the input circuit producing the plurality of input signals.

6. A circuit as in claim 1, wherein each of the first and second estimate signals is a Rayleigh fading parameter estirate.

7. A circuit as in claim 1, wherein each said first input signal is transmitted by a first antenna and each said second input signal is transmitted by a second antenna.

8. A circuit as in claim 7, wherein each of the first and second input signals is a wideband code division multiple access signal.

9. A circuit as in claim 8, wherein a total path diversity of each of the first and second symbol signals is at least twice a number of transmitting antennas.

10. A circuit, comprising:
   an estimate circuit coupled to receive a plurality of predetermined signals from an external source along plural signal paths, the estimate circuit producing a first and a second estimate signal corresponding to each predetermined signal;
   a correction circuit coupled to receive the first and second estimate signals, a first input signal and a second input signal, the correction circuit producing a first symbol signal in response to the first and second estimate signals and the first and second input signals, the correction circuit producing a second symbol signal in response to the first and second estimate signals and the first and second input signals; and
   a synchronization circuit coupled to receive a plurality of symbol signals including the first and second symbol signals and a plurality of first and second known symbols, the synchronization circuit producing a synchronization signal in response to an approximate match between the plurality of first symbol signals and the plurality of first known symbols and between the plurality of second symbol signals and the plurality of second known symbols.

11. A circuit as in claim 10, wherein each predetermined signal of the plurality of predetermined signals comprises a pilot symbol.

12. A circuit as in claim 10, further comprising an input circuit coupled to receive a plurality of external signals during a predetermined time, the input circuit producing a plurality of input signals including the first and second input signals, the plurality of input signals corresponding to the plural of signal paths.

13. A circuit as in claim 10, wherein each of the first and second estimate signals is a Rayleigh fading parameter estimate.

14. A circuit as in claim 10, wherein each said first input signal is transmitted from a first antenna and each said second input signal is transmitted by a second antenna.

15. A circuit as in claim 14, wherein each of the first and second input signals are wideband code division multiple access signals.

16. A circuit as in claim 15, wherein a total path diversity of each of the first and second symbol signals is at least twice a number of transmitting antennas.

17. A method of processing signals in a communication circuit, comprising the steps of:
   receiving a plurality of groups of predetermined signals during a predetermined time from an external source along plural signal paths, the groups being equally spaced apart in time;
   producing at least two estimate signals in response to each said group of predetermined signals;
   producing a first and a second input signal corresponding to a signal path of the plural signal paths in response to each said group of predetermined signals;
   producing a plurality of first symbol signals in response to respective said at least two estimate signals and respective said first and second input signals;
   producing a plurality of second symbol signals in response to respective said at least two estimate signals and respective said first and second input signals;
   comparing the plurality of first symbol signals to a plurality of known first symbols;
   comparing the plurality of second symbol signals to a plurality of known second symbols; and
   producing a synchronization signal in response to the comparing steps.

18. A method of processing signals as in a claim 17, further comprising the steps of:
   producing a first of said at least two estimate signals from a sum of at least two predetermined signals of each respective said group of predetermined signals; and
   producing a second of said at least two estimate signals from a difference between at least two other predetermined signals of each respective said group of predetermined signals.

19. A method of processing signals as in a claim 17, wherein the step of comparing the plurality of first symbol signals to a plurality of known first symbols includes comparing each known first symbol to each first symbol signal and wherein the step of comparing the plurality of second symbol signals to a plurality of known second symbols includes comparing each known second symbol to each second symbol signal.

20. A mobile communication system, comprising:
   a mobile antenna arranged to receive a plurality of signals from an external source along a plurality of signal paths;
   an input circuit coupled to receive the plurality of signals from the mobile antenna, the input circuit producing a plurality of input signals including a first input signal and a second input signal corresponding to a respective signal path of the plurality of signal paths;

a correction circuit coupled to receive a first estimate signal, a second estimate signal, and the first and second input signals, the correction circuit producing a first symbol estimate in response to the first and second estimate signals and the first and second input signals, the correction circuit producing a second symbol estimate in response to the first and second estimate signals and the first and second input signals;

a combining circuit coupled to receive a plurality of first symbol estimates including the first symbol estimate and a plurality of second symbol estimates including the second symbol estimate, the combining circuit producing a first symbol signal in response to the plurality of first symbol estimates and producing a second symbol signal in response to the plurality of second symbol estimates; and a synchronization circuit coupled to receive the first and second symbol signals and a first known symbol and a second known symbol the synchronization circuit producing a synchronization signal in response to an approximate match between the first symbol signal and the first known symbol and between the second symbol signal and the second known symbol.

21. A mobile communication system as in claim 20, further comprising an estimate circuit coupled to receive at least a first predetermined signal and a second predetermined signal from the external source, each of the first and second predetermined signals having respective predetermined values, the estimate circuit producing the first estimate signal and the second estimate signal in response to the first and second predetermined signals.

22. A mobile communication system as in claim 21, wherein each of the first and second predetermined signals are pilot symbols.

23. A mobile communication system as in claim 21, wherein the estimate circuit, the correction circuit, the combining circuit and the synchronization circuit are formed on a single integrated circuit.

24. A mobile communication system as in claim 20, wherein each of the first and second estimate signals is a Rayleigh fading parameter estimate.

25. A mobile communication system as in claim 20, wherein each said first input signal is transmitted by a first antenna and each said second input signal is transmitted by a second antenna.

26. A mobile communication system as in claim 25, wherein each of the first and second input signals is a wideband code division multiple access signal.

27. A mobile communication system as in claim 26, wherein a total path diversity of each of the first and second symbol signals is at least twice a number of transmitting antennas.

* * * * *

UNITED STATES PATENT AND TRADEMARK OFFICE
CERTIFICATE OF CORRECTION

PATENT NO. : 6,356,605 B1  
APPLICATION NO. : 09/195942  
DATED : March 12, 2002  
INVENTOR(S) : Srinath Hosur and Anand G. Dabak Page 1 of 3

It is certified that error appears in the above-identified patent and that said Letters Patent is hereby corrected as shown below:

Delete the Title page and substitute therefore the attached Title page consisting of the corrected illustrative figure.

Delete Drawing Sheet 1 of 2 and substitute therefore the attached Drawing Sheet 1 of 2 consisting of corrected Fig. 3.

Figure 3 – The term " $R_j^1$ " should be changed to -- $R_j^2$ -- at lead 324.

Figure 3 – The term " $R_j^2$ " should be changed to -- $R_j^4$ -- at lead 326.

Col. 4, line 42 – The term "imput" should be changed to --input--.

Col. 4, line 60 – Equation [8] should be changed from " $R_j^4 = \alpha_j^1 S_1 + \alpha_j^2 S_1^*$ " to -- $R_j^4 = \alpha_j^1 S_2 + \alpha_j^2 S_1^*$ --.

Signed and Sealed this  
Seventh Day of June, 2011

David J. Kappos  
*Director of the United States Patent and Trademark Office*

(12) United States Patent
Hosur et al.

(10) Patent No.: US 6,356,605 B1
(45) Date of Patent: Mar. 12, 2002

(54) FRAME SYNCHRONIZATION IN SPACE TIME BLOCK CODED TRANSMIT ANTENNA DIVERSITY FOR WCDMA

(75) Inventors: Srinath Hosur, Dallas; Anand G. Dabak, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/195,942

(22) Filed: Nov. 19, 1998

Related U.S. Application Data

(60) Provisional application No. 60/103,383, filed on Oct. 7, 1998.

(51) Int. Cl.[7] .............................. H04B 7/10; H04L 1/02
(52) U.S. Cl. ........................................ 375/347; 375/343
(58) Field of Search .................................. 375/347, 354, 375/316, 136, 142, 143, 145, 147, 149, 150, 343

(56) References Cited

U.S. PATENT DOCUMENTS

| | | | |
|---|---|---|---|
| 5,228,054 A | | 7/1993 | Rueth et al. .................... 375/1 |
| 5,767,738 A | * | 6/1998 | Brown et al. ................ 329/304 |
| 6,166,622 A | * | 12/2000 | Hosur et al. ................. 340/318 |
| 6,226,315 B1 | * | 5/2001 | Sriram et al. ................. 375/140 |

OTHER PUBLICATIONS

"Report On FPLMTS Radio Transmission Technology Special Group", (Round 2 Activity Report), Association of Radio Industries and Business (ARIB), FPLMTS Study Committee, Draft Version E1.1, Jan. 10, 1997, 224 pp.

"Proposed Wideband CDMA (W-CDMA)", Association of Radio Industries and Businesses (ARIB), Japan, Jan. 1997, 213 pp.

* cited by examiner

Primary Examiner—Mohammad H. Ghayour
(74) Attorney, Agent, or Firm—Robert N. Rountree; Wade James Brady, III; Frederick J. Telecky, Jr.

(57) ABSTRACT

A circuit is designed with a correction circuit (350) coupled to receive a first estimate signal ($\alpha_j^1$), a second estimate signal ($\alpha_j^2$), and a plurality of input signals from an external source along plural signal paths. The plurality of input signals includes a first and a second input signal ($R_j^1$, $R_j^2$) The correction circuit produces a first symbol estimate in response to the first and second estimate signals and the first and second input signals. The correction circuit produces a second symbol estimate in response to the first and second estimate signals and the first and second input signals. A combining circuit is coupled to receive a plurality of first symbol estimates including the first symbol estimate and a plurality of second symbol estimates including the second symbol estimate. The combining circuit produces a first symbol signal ($\tilde{S}_1$) in response to the plurality of first symbol estimates and a second symbol signal ($\tilde{S}_2$) in response to the plurality of second symbol estimates. A synchronization circuit (408) is coupled to receive the first and second symbol signals (400–406) and a first known symbol and a second known symbol (410–416). The synchronization circuit produces a synchronization signal (418) in response to an approximate match between the first symbol signal and the first known symbol and between the second symbol signal and the second known symbol.

27 Claims, 2 Drawing Sheets